United States Patent [19]
Johnson et al.

[11] Patent Number: 5,243,114
[45] Date of Patent: Sep. 7, 1993

[54] OLIGOMERIZATION OF ALPHA-OLEFINS OVER LAYERED SILICATE COMPOSITIONS CONTAINING PILLARS OF SILICA AND GROUP VIB METAL OXIDE

[75] Inventors: Ivy D. Johnson, Medford; Garry W. Kirker, Washington Township, Bergen County; Michael E. Landis, Woodbury; Margaret M. Wu, Skillman, all of N.J.

[73] Assignee: Mobil Oil Corporation, Fairfax, Va.

[21] Appl. No.: 941,489

[22] Filed: Sep. 8, 1992

[51] Int. Cl.$^5$ .................................... C07C 2/02
[52] U.S. Cl. .............................. 585/329; 585/310; 585/520; 585/530
[58] Field of Search ............... 585/310, 329, 520, 530

[56] References Cited

U.S. PATENT DOCUMENTS

| | | | |
|---|---|---|---|
| 4,791,088 | 12/1988 | Chu et al. | 502/240 |
| 4,827,064 | 5/1989 | Wu | 585/10 |
| 4,859,648 | 8/1989 | Landis et al. | 502/242 |
| 4,968,652 | 11/1990 | Johnson et al. | 502/63 |
| 5,012,020 | 4/1991 | Jackson et al. | 585/10 |
| 5,105,051 | 4/1992 | Pelrine et al. | 585/528 |

FOREIGN PATENT DOCUMENTS 8800176  1/1988  PCT Int'l Appl.

*Primary Examiner*—Patrick P. Garvin
*Assistant Examiner*—E. D. Irzinski
*Attorney, Agent, or Firm*—Alexander J. McKillop; Dennis P. Santini; Laurence P. Hobbes

[57] ABSTRACT

There is provided a method for preparing alpha-olefin oligomers of superior lubricating properties by contacting an alpha-olefin feed under oligomerization conditions with a catalyst comprising an activated layered silicate containing silica and oxide of Group VIB metal, e.g., Cr, between its layers. The catalyst can be activated by exposure to an oxidation gas at high temperature followed by treatment with a reducing agent, e.g., CO.

20 Claims, No Drawings

OLIGOMERIZATION OF ALPHA-OLEFINS OVER LAYERED SILICATE COMPOSITIONS CONTAINING PILLARS OF SILICA AND GROUP VIB METAL OXIDE

The present invention relates to a method for the oligomerization of alpha-olefins such as 1-decene over an activated layered silicate composition. The layered silicate comprises silica pillars and oxides of Group VIB metal, e.g., chromium, between its layers and exhibits significant activity for alpha-olefin oligomerization to form products of superior lubricating properties in high yields.

BACKGROUND OF THE INVENTION

Efforts to improve upon the performance of natural mineral oil based lubricants by the synthesis of oligomeric hydrocarbon fluids have been the subject of important research and development in the petroleum industry for at least fifty years and have led to the relatively recent market introduction of a number of superior polyalpha-olefin synthetic lubricants, primarily based on the oligomerization of alpha-olefins or 1-alkenes. In terms of lubricant property improvement, the thrust of the industrial research effort on synthetic lubricants has been toward fluids exhibiting useful viscosities over a wide range of temperature, i.e., improved viscosity index, while also showing lubricity, thermal and oxidative stability and pour point equal to or better than mineral oil. These new synthetic lubricants lower friction and hence increase mechanical efficiency across the full spectrum of mechanical loads from worm gears to traction drives and do so over a wider range of operating conditions than mineral oil lubricants.

The chemical focus of the research effort in synthetic lubricants has been on the polymerization of 1-alkenes. Well known structure/property relationships for high polymers as contained in the various disciplines of polymer chemistry have pointed the way to 1-alkenes as a fruitful field of investigation for the synthesis of oligomers with the structure thought to be needed to confer improved lubricant properties thereon. Due largely to studies on the polymerization of propene and vinyl monomers, the mechanism of the polymerization of 1-alkene and the effect of that mechanism on polymer structure is reasonably well understood, providing a strong resource for targeting on potentially useful oligomerization methods and oligomer structures. Building on that resource, in the prior art oligomers of 1-alkenes from $C_6$ to $C_{20}$ have been prepared with commercially useful synthetic lubricants from 1-decene oligomerization yielding a distinctly superior lubricant product via either cationic or Ziegler catalyzed polymerization. Particularly useful 1-alkene oligomers have been found to have a relatively low ratio of methyl to methylene groups in the oligomer. The ratio is called the branch ratio and is calculated from infrared data as discussed in "Standard Hydrocarbons of High Molecular Weight," *Analytical Chemistry*, Vol. 25, No. 10, p. 1466 (1953) Viscosity index has been found to increase with lower branch ratio. Heretofore, oligomeric liquid lubricants exhibiting very low branch ratios have not been synthesized from 1-alkenes. For instance, oligomers prepared from 1-decene by either cationic polymerization or Ziegler catalyst polymerization have branch ratios of greater than 0.20. Shubkin, *Ind. Eng. Chem. Prod. Res. Dev.* 1980, 19, 15–19, provides an explanation for the apparently limiting value for branch ratio based on a cationic polymerization reaction mechanism involving rearrangement to produce branching. Other explanations suggest isomerization of the olefinic group in the one position to produce an internal olefin as the cause for branching. Whether by rearrangement, isomerization or a yet to be elucidated mechanism, it is clear that in the art of 1-alkene oligomerization to produce synthetic lubricants as practiced to-date excessive branching occurs and constrains the limits of achievable lubricant properties, particularly with respect to viscosity index. Obviously, increased branching increases the number of isomers in the oligomer mixture, orienting the composition away from the structure which would be preferred from a consideration of the theoretical concepts discussed above.

Theoretically, the oligomerization of 1-decene, for example, to lubricant oligomers in the $C_{30}$ and $C_{40}$ range can result in a very large number of structural isomers. Henze and Blair, J.A.C.S. 54, 1538, calculate over $60 \times 10^{12}$ isomers for $C_{30}$–$C_{40}$. Discovering exactly those isomers, and the associated oligomerization process, that produce a preferred and superior synthetic lubricant meeting the specification requirements of wide-temperature fluidity while maintaining low pour point represents a prodigious challenge to the workers in the field. Brennan, Ind. Eng. Chem. Prod. Res. Dev. 1980, 19, 2–6, cites 1-decene trimer as an example of a structure compatible with structures associated with superior low temperature fluidity wherein the concentration of atoms is very close to the center of a chain of carbon atoms. Also described therein is the apparent dependency of the oligomer on the oligomerization process, i.e., cationic polymerization or Ziegler-type catalyst, known and practiced in the art.

U.S. Pat. No. 4,827,064 to Wu discloses high viscosity index synthetic lubricant compositions. These materials exhibit a low branch ratio, high viscosity index and low pour point. These compositions comprise $C_{30}$–$C_{1300}$ hydrocarbons, said compositions having a branch ratio of less than 0.19; weight average molecular weight between 300 and 45,000; number average molecular weight between 300 and 18,000; molecular weight distribution between 1 and 5 and pour point below $-15°$ C. These low branch ratios and pour points characterize the compositions of the invention, referred to herein as polyalpha-olefin or HVI-PAO, conferring upon the compositions especially high viscosity indices in comparison to commercially available polyalpha-olefin (PAO) synthetic lubricants. Such compositions have been prepared by oligomerization of alpha-olefins such as 1-decene under oligomerization conditions in contact with an amorphous silica-supported and reduced valence state metal oxide catalyst from Group VIB of the IUPAC Periodic Table, e.g., chromium oxide. U.S. Pat. No. 5,012,020 discloses the preparation of a similar HVI-PAO with viscosity at 100° C. greater than 15,000 cs which can be used as a Newtonian lube blend.

U.S. Pat. No. 5,105,051 discloses the preparation of HVI-PAO olefin oligomers over a catalyst comprising mesoporous siliceous material, e.g. MCM-41, and reduced Group VIB metal, e.g. chromium, in form of its oxide.

The entire contents of these disclosures are incorporated herein by reference.

Despite the desirability of the product produced by the process of Wu et al., the amorphous silica catalysts used are difficult to provide in a highly active form. Moreover, the mechanical strength of the amorphous silica catalyst can be less than what is necessary to maintain catalyst integrity during numerous reaction and regeneration cycles.

SUMMARY OF THE INVENTION

It has now been found that alpha-olefins can be oligomerized over an activated layered silicate composition to form products of superior lubricating properties. The present invention relates to a method for preparing a liquid lubricant composition which comprises i) oligomerizing $C_2$ to $C_{20}$ alpha-olefin feedstock, e.g., $C_6$ to $C_{20}$ alpha-olefin feedstock, or mixtures thereof by contacting said feedstock under oligomerization conditions with catalyst comprising a layered silicate composition comprising silica and Group VIB metal oxide between its layers, which catalyst has been activated by exposure to oxidation conditions followed by reduction conditions, to form a liquid lubricant composition comprising $C_{30}$–$C_{10000}$ hydrocarbons and having a branch ratio of less than 0.19, weight average molecular weight between 300 and 250,000, number average molecular weight between 300 and 50,000, molecular weight distribution between 1 and 5, and pour point below $-15°$ C.; and ii) collecting said liquid lubricant composition.

In one embodiment, the liquid lubricant composition has a $C_{30}$ fraction with a branch ratio below 0.19, viscosity index greater than 130 and pour point below $-45°$ C.

The oligomeric products prepared by the present invention are described further in the above-noted U.S. Pat. No. 4,827,064. Such products can comprise dimers of 1-decene, i.e., $C_{20}H_{42}$, e.g., 8-eicosene, 9-eicosene, 2-octyldodecene, 9-methyl-8-nonadecene, and 9-methyl-9-nonadecene; and trimers of 1-decene, i.e., $C_{30}H_{60}$ alkenes, e.g., 11-octyldocosene and 9-methyl,11-octylheneicosene. The lubricant fraction contains only $C_{30}$ and higher hydrocarbons. In order to achieve the best oxidative stabilities, the oligomers of $C_{30}$ and higher are usually hydrogenated using any typical hydrogenation catalyst, such as Ni-on-Kieselguhr catalyst or Pd-on-charcoal catalyst. The finished lube product has a branch ratio, or $CH_3/CH_2$ ratio, of less than 0.19 and molecular weight distribution of about 1.05 to 2.5. These low branch ratios and pour points of less than $-15°$ C. characterize the compositions prepared by the invention, referred to herein as polyalpha-olefin or HVI-PAO, conferring upon the compositions especially high viscosity indices in comparison to commercially available polyalpha-olefin (PAO) synthetic lubricants.

These lubricant oligomers can also be made in a wide range of molecular weights and viscosities comprising $C_{30}$ to $C_{10000}$ hydrocarbons having a branch ratio of less than 0.19 and molecular weight distribution of about 1.05 to 5.0. Such lubricant oligomers can have a viscosity index of at least 130, preferably between 130 and 400, and viscosity at 100° C. between 3 and 15000 centistokes, preferably between 3 and 3000 centistokes. In addition, the oligomers prepared according to the present invention can exhibit low pour points, say, below $-15°$ C. The oligomers can be mixed with conventional mineral oils or greases of other properties to provide compositions also possessing outstanding lubricant properties.

The hydrocarbons produced in accordance with the invention can contain alkanes, alkenes, or mixtures thereof. In one embodiment, the liquid lubricant composition comprises $C_{30}H_{62}$ alkanes having a branch ratio less than 0.19 and pour point below $-15°$ C., preferably having a viscosity between 3 and 4 centistokes at 100° C., a viscosity index greater than 180 and a pour point below $-45°$ C. Unless otherwise stated, all references to HVI-PAO oligomers or lubricants refer to hydrogenated oligomers and lubricants in keeping with the practice well known to those skilled in the art of lubricant production. As oligomerized, HVI-PAO oligomers are mixtures of dialkyl vinyledenic and 1,2 dialkyl or trialkyl mono-olefins. Lower molecular weight unsaturated oligomers are preferably hydrogenated to produce thermally and oxidatively stable, useful lubricants. Higher molecular weight unsaturated HVI-PAO oligomers are sufficiently thermally stable to be utilized without hydrogenation and, optionally, may be so employed. Both unsaturated and hydrogenated HVI-PAO of lower or higher molecular weight exhibit viscosity indices of at least 130 and pour point below $-15°$ C.

The catalyst compositions employed in the present invention exhibit unusually high activities for olefin polymerization than Group VIB catalysts supported on amorphous silica of similar surface area and pore opening size. The layered silicates employed herein are denser than amorphous silica and can be extruded.

DETAILED DESCRIPTION OF THE INVENTION

The present invention employs a catalyst of high oligomerization activity which comprises a layered silicate composition. The catalyst exhibits great mechanical strength and durability which maintains catalyst integrity during numerous reaction and regeneration cycles.

Many layered materials are known which have three-dimensional structures which exhibit their strongest chemical bonding in only two dimensions. In such materials, the stronger chemical bonds are formed in two-dimensional planes and a three-dimensional solid is formed by stacking such planes on top of each other. However, the interactions between the planes are weaker than the chemical bonds holding an individual plane together. The weaker bonds generally arise from interlayer attractions such as Van der Waals forces, electronic interactions, and hydrogen bonding. In those situations where the layered structure has electronically neutral sheets interacting with each other solely through Van der Waals forces, a high degree of lubricity is manifested as the planes slide across each other without encountering the energy barriers that arise with strong interlayer bonding. Graphite is an example of such a material. The silicate layers of a number of clay materials are held together by electrostatic attraction mediated by ions located between the layers. In addition, hydrogen bonding interactions can occur directly between complementary sites on adjacent layers, or can be mediated by interlamellar bridging molecules.

Laminated materials such as clays may be modified to increase their surface area. In particular, the interlamellar spacing can be increased substantially by absorption of various swelling agents such as water, ethylene glycol, amines, ketones, etc., which enter the interlamellar space and push the layers apart. However, the interlamellar spaces of such layered materials tend to collapse when the molecules occupying the space are removed, for example, by exposing the clays to high temperatures. Accordingly, such layered materials having enhanced surface area are not suited for use in chemical processes involving even moderately severe conditions.

Layered metal chalcogenide materials enjoying thermal stability can be prepared by a method described in U.S. Pat. No. 4,859,648, and incorporated herein by reference. The method comprises treating a layered chalcogenide, e.g., oxide, of at least one element having an atomic number of 4, 5, 12 to 15, 20 to 33, 38 to 51, 56 to 83 and greater than 90, inclusive, which contains ion exchange sites having interspathic cations associated therewith, with an organic compound which is a cationic species, e.g., n-alkylammonium, or capable of forming a cationic species e.g., n-alkylamine, to effect exchange with said interspathic cations in order to swell the layered material. An electrically neutral compound capable of conversion to an interspathic polymeric chalcogenide, e.g., tetraethylorthosilicate, is thereafter provided between the layers of the swelled, layered chalcogenide. The compound is then converted to the interspathic polymeric chalcogenide to form the layered material. Layered silicates, e.g., magadiite and kenyaite can be intercalated with polymeric silica by this technique.

U.S. Pat. No. 4,791,088, incorporated herein by reference, discloses layered silicate composition MCM-20 (synthetic kenyaite) containing pillars derived from pillaring agent compounds of Si, Al, Fe, Cr, B, Ca, and Mg, alone or in combination of silica and metal oxide, e.g., chromium oxide, and its preparation. The composition is prepared by swelling the layered silicate with an aliphatic amine prior to treatment with the pillaring agent(s), e.g., tetraethylorthosilicate (TEOS). Such materials can be employed as the layered silicate composition used in the present invention.

U.S. Pat. No. 4,968,652, incorporated herein by reference, discloses a method of preparing pillared layered silicate compositions which contain pillars comprising silica and metal oxide by contacting an organic swollen layered silicate material with a hydrolyzable silica pillar precursor material which forms silanol groups. The resulting material is contacted with an aqueous solution containing a hydrated metal salt and hydrolysis of the silanol groups is then effected. The aqueous solution containing hydrated metal salt is believed to facilitate hydrolysis of the silanol groups. The hydrolysis provides pillars comprising silica and metal oxide disposed between the layers of the layered silicate material. The method is particularly suited to treating layered silicates. Such layered silicates include high silica alkali silicates such as magadiite, natrosilite, kenyaite, makatite, nekoite, kanemite, okenite, dehayelite, macdonaldite, and rhodesite. The layered silicate compositions used in the present invention are derived from high silica alkali silicates whose layers lack octahedral sheets. These materials are prepared hydrothermally from a highly alkaline aqueous reaction mixture containing sources of silicon oxide, silica and organic at relatively moderate temperatures and pressures. These organic-swelled, layered silicates may contain tetracoordinate framework atoms other than Si, which can be prepared by co-crystallizing in the presence of non-silicon tetravalent elements, e.g., those selected from the group consisting of Al, B, Cr, Fe, Ga, In, Ni, Zr as well as any other such elements which are catalytically useful when incorporated in the silicate structure. Alternatively, non-silicon framework elements already in a layered silicate may be substituted by a tetracoordinate element. For example, kenyaite containing boron in its framework when treated with aluminum nitrate results in a kenyaite which contains aluminum in its framework. Both co-crystallized and substituted organic-swelled layered, high silica alkali silicates may be treated to provide layered materials containing interspathic polymeric silica and Group VIB metal oxide pillars which are suitable for use in the present invention.

Synthetic magadiite-type materials which contain interspathic polymeric oxides, e.g., MCM-24 can be readily synthesized hydrothermally from a reaction mixture containing inexpensive sources of silica and caustic. Tetracoordinate elements other than silicon, e.g., those selected from the group consisting of Al, B, Cr, Fe, Ga, In, Ni, Zr and other catalytically useful metals, may be added to the reaction mixture to produce synthetic magadiite-type layered silicates. Preferably, such elements are selected from the group consisting of Al and Fe. An organic directing agent may also be added to the reaction mixture. The reaction mixture for synthetic magadiite-type materials can be described in molar ratios as follows:

| | |
|---|---|
| $SiO_2/X_2O_3 =$ | 10 to infinity where X can be Al, B, Cr, Fe, Ga, and/or Ni or other catalytically useful metal |
| $M^+OH^-/SiO_2 =$ | 0 to 0.6, (preferably 0.1 to 0.6); M = any alkali metal |
| $H_2O/SiO_2 =$ | 8 to 500 |
| $R/SiO_2 =$ | 0 to 0.4 | where R can be an organic such as benzyltriethylammonium chloride, benzyltrimethylammonium chloride, dibenzyldimethylammonium chloride, N,N'-dimethylpiperazine, triethylamine, or other quaternary compounds or heterocyclic amines.

The reaction mixture can be maintained at a temperature of about 100° to 200° C. for anywhere from about 1 to 150 days in order to form a product having the following composition:

| | |
|---|---|
| % M = | 0 to 3, e.g., 0 to 0.3 |
| $SiO_2/X_2O_3 =$ | 10 to infinity, where X may be in the tetrahedral or octahedral position |
| $M_2O/SiO_2 =$ | 0 to 0.5, preferably 0.5 to 0.1 |

The synthetic layered silicate materials thus prepared are of low surface area. Introduction of interspathic pillars as earlier described can increase the surface area of these materials. Generally, the synthetic magadiite-type material is acidified by any suitable means, e.g., treatment with aqueous 0.1 N HCl, and thereafter treated with a "propping" or swelling agent.

Synthetic magadiite layered silicates intercalated with an organic swelling agent can also be readily synthesized hydrothermally from an organic-swelled reaction mixture containing inexpensive sources of silica, caustic and organic onium compound. These organic-swelled, layered magadiite-type materials can be directly crystallized by a process disclosed in U.S. patent application Ser. No. 869,589, filed Apr. 16, 1992, and are suited to use in accordance with the present invention. Elements other than silicon, e.g., those selected from the group consisting of Al, B, Cr, Fe, Ga, In, Ni, Zr and other catalytically useful metals, may be added to the reaction mixture to produce organic-swelled synthetic magadiite layered silicates. The reaction mixture for synthetic magadiite materials can be described in molar ratios as follows:

| | |
|---|---|
| $SiO_2/T_2O_3 =$ | 10 to infinity where T can be Al, B, Cr, Fe, Ga, and/or Ni or other catalytically useful metal |
| $A^+OH^-/SiO_2 =$ | 0 to 0.6, (preferably 0.1 to 0.6; A = any alkali metal |
| $H_2O/SiO_2 =$ | 8 to 500, preferably 10 to 40 |
| $R^1R^2R^3R^4M^+X^-/SiO_2 =$ | 0.02 to 1.0, preferably 0.04 to 0.30, R = alkyl or alkenyl of up to 24 carbon atoms or combinations thereof, provided at least one R has at least eight, preferably at least 12, e.g., about 16, carbon atoms; M is an element capable of coordination with said $R^1$, $R^2$, $R^3$ and $R^4$ to form a cation, e.g., M can be a tetracoordinatable element (such as nitrogen, phosphorus, arsenic, antimony or bismuth); and $X^-$ is an anion (e.g., fluoride, chloride, bromide, iodide, hydroxide, acetate, sulfate, or carboxylate) |

The reaction mixture can be maintained at a temperature of about 100° to 200° C. for anywhere from about 1 to 150 days, preferably 1 to 6 days, in order to form a product having the following composition:

| | |
|---|---|
| % M = | 0 to 3, e.g., 0 to 0.3 |
| $SiO_2/T_2O_3 =$ | 10 to infinity, preferably 10 to 200 |
| % C = | 5 to 100, preferably 5 to 50 |
| $A_2O/SiO_2 =$ | 0 to 0.5, preferably 0.05 to 0.1 | where A, M and T are as described above.

The synthetic layered silicate materials thus prepared contain organic swelling agent between their layers. Introduction of interspathic polymeric chalcogenides as earlier described can increase the surface area and thermal stability of these materials. The resulting material may then be calcined to remove residual organics.

Another aspect of the present invention resides in using as layered silicates synthetic kenyaite materials which contain interspathic polymeric oxides. Kenyaite, a layered silicic acid which is known to exist in nature as a sodium salt $Na_2Si_{22}O_{45}H_2O$ can be prepared in the potassium form $K_2Si_{22}O_{45}10H_2O$ in the laboratory. Above-noted U.S. Pat. No. 4,791,088 discloses methods of preparing a synthetic kenyaite material designated MCM-20. Synthetic kenyaite is readily synthesized hydrothermally from a reaction mixture containing inexpensive sources of silica, caustic, preferably KOH. Tetracoordinate elements other than silicon, e.g., those selected from the group consisting of Al, B, Cr, Fe, Ga, In, Ni, Zr and other catalytically useful metals, may be added to the reaction mixture to produce synthetic kenyaite layered silicates. $Al(NO_3)_3 \cdot 9H_2O$ and aluminum-tri-sec-butoxide are suitable reagents for the introduction of non-silicon tetracoordinate elements in the kenyaite framework. Co-crystallizing with B, Al, Ga, Fe and/or Zr is particularly preferred. The reaction mixture may also be seeded with kenyaite.

Organic-swelled, layered kenyaite-type materials can be directly crystallized by the process disclosed in U.S. patent application Ser. No. 07/869,589 filed Apr. 13, 1992, noted above. These materials can also be used in accordance with the present invention.

All of the above-described layered silicates in their organic-swollen form can be contacted with a hydrolyzable silica pillar precursor material which forms silanol groups. In one embodiment, the resulting product is thereafter exposed to hydrolyzing conditions, e.g., exposure to water. After drying, the product is contacted with an aqueous or organic solution containing a Group VIB metal salt (Cr, Mo, and/or W). Any suitable organic solvent known to the art may be used, for example, ethanol, methanol, or acetic acid. In another embodiment, the hydrolyzable silica pillar precursor material is added in combination with the aqueous solution containing Group VIB metal salt thereby effecting hydrolysis of the silanol groups and introduction of the Group VIB metal in a single step. The resulting product of either embodiment contains pillars comprising silica and Group VIB metal oxide disposed between the layers of the layered silicate material.

Preferred Group VIB metal salts are salts of Cr. The metal salt comprises a suitable anion, e.g., an anion selected from the group consisting of $NO_3^-$, $CO_3^=$, $SO_4^=$, $Cl^-$, $OAc^-$, $ClO_4^-$, $Br^-$, and $F^-$. $Cr(NO_3)_3$ is an especially preferred salt for treatment of the layered silicate materials. The aqueous solution containing Group VIB metal salt can contain 0.001 to 1.0 moles per liter of said salt, preferably 0.01 to 1 moles per liter, even more preferably, 0.1 to 0.5 moles per liter of said salt. The salt solution is contacted with the layered silicate under conditions sufficient to provide a material having Group VIB metal oxide disposed between the layers of the layered silicate material. Such conditions can comprise contacting times of 0.5 to 6 hours, preferably 1 to 2 hours, and temperatures of 20° to 540° C., preferably 20° to 100° C.

The resulting Group VIB metal-containing layered silicate product is then dried and calcined at 200° to 900° C., e.g., 400° to 700° C., by air or other oxygen-containing gas. Optionally, the calcination can be initiated in the presence of an inert gas, e.g., nitrogen and then completed in an oxygen-containing gas. Thereafter, the catalyst is reduced by a suitable reducing agent such as, for example, CO, $H_2$, $NH_3$, $H_2S$, $CS_2$, $CH_3SCH_3$, $CH_3SSCH_3$, metal alkyl containing compounds such as $R_3Al$, $R_3B$, $R_2Mg$, RLi, $R_2Zn$, where R is alkyl, alkoxy, aryl and the like. Preferred are CO or $H_2$ or metal alkyl containing compounds, with CO especially preferred. Such reduction can be carried out at temperatures below those employed for oxidation, e.g., 350° C. or less.

The resultant catalyst can be used to oligomerize olefins at a temperature range from below room temperature to about 250° C., preferably 20° to 250° C., e.g., 90° to 250° C., at a pressure of 0.1 atmosphere to 5000 psi, preferably 1 to 500 psi. Contact time of both the olefin and the catalyst can vary from one second to 24 hours. Preferred operating conditions comprise feedstock to catalyst ratios between 10000:1 and 10:1, preferably between 1000:1 and 30:1. The catalyst can be used in a batch type reactor or in a fixed bed, continuous-flow reactor.

The layered silicate composition employed in the present invention has an interlayer distance of at least 6 A, preferably 8 to 100 A, e.g., 10 to 20 A, and a surface area of 50 to 900 m$^2$/g, preferably 200 to 700 m$^2$/g.

Olefins suitable for use as starting material in the invention include those olefins containing from 2 to about 20 carbon atoms such as ethylene, propylene, 1-butene, 1-pentene, 1-hexene, 1-octene, 1-decene, 1-dodecene and 1-tetradecene and branched chain isomers such as 4-methyl-1-pentene. Also suitable for use are olefin-containing refinery feedstocks or effluents. However, the olefins used in this invention are preferably alpha olefinic as for example 1-heptene to 1-hexadecene and more preferably 1-hexene to 1-tetradecene, or mixtures of such olefins. 1-Decene is an especially preferred feed. The catalyst is also very effective in copolymerizing ethylene with a higher alpha-olefin, (e.g., $C_3$ to $C_{10}$ alpha-olefin) such as ethylene and propylene, ethylene and 1-butene, or ethylene, propylene and 1-decene. 16. The method of claim 1 wherein ethylene is co-polymerized with a higher alpha-olefin.

The following examples of the instant invention are presented merely for illustration purposes and are not intended to limit the scope of the present invention.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha Test is described in U.S. Pat. No. 3,354,078, in the Journal of Catalysis, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the Journal of Catalysis, Vol. 61, p. 395.

All polymerization reactions were carried out under nitrogen atmosphere with a minimum amount of oxygen or moisture or any other impurity in the reactor system. Feed olefins were purified through 13X molecular sieve and purged with $N_2$.

EXAMPLE 1

Ultrasil amorphous precipitated silica (65 g, 1 mole), available from PQ Corporation, Valley Forge, Pa., was slurried in $H_2O$ (200 g) and then added to an aqueous KOH solution (6 g 85% KOH in 50 g $H_2O$). To this mixture was added a solution containing cetyltrimethylammonium chloride ($CH_3(CH_2)_{15}N(CH_3)_3Cl$) (34 g, 0.09 moles) in $H_2O$ (100 g). The reaction mixture was stirred thoroughly, then crystallized at 150° C. for 120 hours in a stirred 600 ml autoclave. The product was filtered, washed with $H_2O$, and air dried. 10 g of the as-synthesized, air dried material was pillared directly with tetraethylorthosilicate (TEOS) by suspending it in TEOS (50 g) and stirring for 24 hours in a closed polypropylene jar. The slurry was filtered and air dried. 43 g of the resulting product were slurried in 500 g of 0.5 M $Cr(NO_3)_3$. The slurry was stirred for two hours, then filtered, air-dried, and calcined for six hours at 540° C. The composition and physical properties of the product are given below:

Surface area, m$^2$/g 569
Calculated interlayer distance (A) 20
Cr, wt % 2.1
SiO$_2$, wt % 80.1
Ash @1000° C., wt % 84.45

This composition was charged in a tubular furnace and heated to 350° C. under flowing nitrogen, followed by air at 550° C. for 16 hours. The catalyst was then cooled down under nitrogen to 350° C. and reduced with CO for one hour. The final catalyst was cooled down and stored under nitrogen.

EXAMPLE 2

Purified 1-decene (100 g) and the activated catalyst prepared in Example 1 (2 g) were mixed under $N_2$ and heated to 125° C. in an oil bath for 16 hours. The viscous liquid product was obtained by filtering off the solid. Distillation at 150° C./0.01 mm Hg provided a product having a dimer yield of 2% and $C_{30+}$ yield of 92%. The $C_{30+}$ fraction had the following viscometric properties: V at 100° C.=105.06 cS, V at 40° C.=951.30 cS and VI=207. This product, after hydrogenation to reduce unsaturation, had a pour point of −36° C.

EXAMPLE 3

Purified 1-decene (100 g) and the activated catalyst prepared in Example 2 (2 g) were mixed under $N_2$ and heated to 180° C. in an oil bath for 16 hours. The viscous liquid product was obtained by filtering off the solid. Distillation at 150° C./0.01 mm Hg provided a product having a dimer yield of 13% and $C_{30+}$ yield of 80%. The $C_{30+}$ fraction had the following viscometric properties: V at 100° C.=21.78 cS, V at 40° C.=155.25 cS and VI=166. This product, after hydrogenation to reduce unsaturation, had a pour point of −51° C.

EXAMPLE 4

200 parts of synthetic magadiite were added to 500 parts distilled water and 200 parts n-octylamine. The mixture was stirred for 24 hours at room temperature, filtered, water washed and air dried. The X-ray powder pattern exhibited a low angle (2 theta)peak at 2.7° indicating a basal or d-spacing of 32.7 A. 17 parts (10 parts dry weight basis) of the dried product were contacted with 70 parts tetraethylorthosilicate (TEOS) with stirring for 48 hours in a sealed vessel at room temperature. The product was filtered, air-dried and dried in vacuo at 82° C. overnight. The dry cake was sized to less than No. 8 mesh and calcined for two hours in flowing nitrogen and two hours in flowing air, all at 540° C. The final product had the following composition:

SiO$_2$ (wt %) 92.0
Al$_2$O$_3$ 0.28
Na 0.053
Ash 93.8
SiO$_2$/Al$_2$O$_3$ (calculated) 556
Surface Area, m$^2$/g 656
Alpha (540° C.) 2
Calculated Interlayer Spacing (A) 20

27 g of the above-prepared silica-pillared magadiite were slurried with a solution containing 40 cc of methanol and 4.5 mole of $Cr(OAc)_3 \cdot 2H_2O$. The slurry was purged with a stream of air at room temperature until dry. The dry powder was then purged with $N_2$ at 350° C., followed by calcination with air at 600° C. for 16 hours. The catalyst was then cooled down to 350° C. and reduced with CO gas for two hours. The final activated catalyst was cooled down and stored under $N_2$ atmosphere before use.

EXAMPLE 5

98 g of purified 1-decene and 2 g of the catalyst of Example 4 were mixed under $N_2$ and heated to 140° C. in an oil bath for 16 hours. The viscous liquid product was obtained by filtering off the solid. Distillation at 150° C./0.01 mm Hg provided a product having a dimer yield of 2% and $C_{30+}$ yield of 79%. The $C_{30+}$ fraction had the following viscometric properties: V at 100° C.=82.58 cS, V at 40° C.=770.54 cS and VI=191.

EXAMPLE 6 (COMPARATIVE)

52 g of silica gel (grade 12, available from Davison Division of W. R. Grace Co.) with a surface area of 720–760 m$^2$/g, pore volume of 0.43 cc/g, average pore diameter of 22 Å, sized 100 to 200 mesh, was mixed with a solution containing 5.4 mole Cr(III) acetate in 75 cc methanol. The solvent was evaporated at 60° C. under a water aspirator. The solid catalyst was activated by treatment with air at 600° C. followed by CO at 350° C. under the conditions and procedures set out in Example 1. When the activated catalyst was reacted with 1-decene as in Example 2, only a trace amount of $C_{30+}$ product was obtained.

It is claimed:

1. A method for preparing a liquid lubricant composition which comprises i) oligomerizing $C_2$ to $C_{20}$ alpha-olefin feedstock, or mixtures thereof by contacting said feedstock under oligomerization conditions with catalyst comprising a layered silicate composition comprising between its layers silica and Group VIB metal oxide, which catalyst has been activated by exposure to oxidation conditions followed by reducing conditions, to form a liquid lubricant composition comprising $C_{30}$–$C_{10000}$ hydrocarbons and having a branch ratio of less than 0.19, weight average molecular weight between 300 and 250,000, number average molecular weight between 300 and 50,000, molecular weight distribution between 1 and 5, and pour point below −15° C.; and ii) collecting said liquid lubricant composition.

2. The method of claim 1 wherein said oligomerization conditions comprise temperatures between 20° and 250° C., pressures between 0.1 and 5000 psi and feedstock to catalyst weight ratio between 10000:1 and 10:1; said catalyst being activated by exposure to air at temperatures ranging of 200° to 900° C. followed by exposure to CO and said layered silicate composition being selected from magadiite, kenyaite, natrosilite, makatite, nekoite, kanemite, okenite, dehayelite, macdonaldite and rhodesite.

3. The method of claim 1 wherein said oligomerization conditions comprise temperatures between 90° and 250° C. and feedstock to catalyst weight ratio between 1000:1 and 30:1; said Group VIB metal is Cr, said layered silicate is kenyaite, and said activation comprises exposure to air at 400° to 600° C. and exposure to CO.

4. The method of claim 1 wherein said liquid lubricant composition comprises $C_{30}$–$C_{10000}$ hydrocarbons and has molecular weight distribution between 1.05 and 5, a viscosity index greater than 130 and viscosity at 100° C. between 3 cs and 15000 cs.

5. The method of claim 1 wherein said liquid lubricant composition comprises a $C_{30}$ fraction with a branch ratio below 0.19, viscosity index greater than 130 and pour point below −15° C.

6. The method of claim 1 wherein said hydrocarbons comprise alkanes.

7. The method of claim 1 wherein said hydrocarbons comprise alkenes.

8. The method of claim 1 wherein said liquid lubricant composition has a viscosity index between 130 and 400.

9. The method of claim 1 wherein said liquid lubricant composition comprises $C_{30}H_{62}$ alkanes having a branch ratio less than 0.19 and pour point below −15° C.

10. The method of claim 9 wherein said alkanes have a viscosity between 3 cs and 4 cs at 100° C., viscosity index greater than 130 and pour point below −45° C.

11. The method of claim 1 wherein said layered silicate composition comprising silica and reduced valence state Group VIB metal oxide between its layers has an interlayer distance of at least 6 angstroms, and a surface area of 100 to 900 m$^2$/g.

12. The method of claim 1 wherein said layered silicate composition comprising silica and Group VIB metal oxide between its layers has an interlayer distance ranging from 10 to 20 angstroms and a surface area of 200 to 700 m$^2$/g.

13. The method of claim 1 wherein said alpha-olefin is selected from 1-octene, 1-decene, 1-dodecene, and mixtures thereof.

14. The method of claim 1 wherein said alpha-olefin is 1-decene.

15. The method of claim 1 wherein the product of i) is hydrogenated to reduce olefin content.

16. The method of claim 1 wherein ethylene is copolymerized with a higher alpha-olefin.

17. The method of claim 16 wherein said higher alpha-olefin is a $C_3$ to $C_6$ alpha-olefin.

18. The method of claim 17 wherein said higher alpha-olefin is propylene.

19. The method of claim 17 wherein said higher alpha-olefin is 1-butene.

20. The method of claim 17 wherein said higher alpha-olefin comprises 1-propylene and 1-decene.

* * * * *